US007680907B2

(12) United States Patent
Zarenin et al.

(10) Patent No.: US 7,680,907 B2
(45) Date of Patent: Mar. 16, 2010

(54) METHOD AND SYSTEM FOR IDENTIFYING AND CONDUCTING INVENTORY OF COMPUTER ASSETS ON A NETWORK

(75) Inventors: Alex Zarenin, Montclair, NJ (US); Anatoliy Belugin, New Windsor, NY (US); Yuri Bernadskii, Verona, NJ (US)

(73) Assignee: Barclays Capital Inc., New York, NY (US)

( * ) Notice: Subject to any disclaimer, the term of this patent is extended or adjusted under 35 U.S.C. 154(b) by 0 days.

(21) Appl. No.: 11/510,131

(22) Filed: Aug. 25, 2006

(65) Prior Publication Data
US 2008/0021984 A1 Jan. 24, 2008

Related U.S. Application Data

(60) Provisional application No. 60/832,420, filed on Jul. 21, 2006.

(51) Int. Cl.
*G06F 15/177* (2006.01)
(52) U.S. Cl. .............. 709/220; 707/1; 707/9; 707/103 R; 709/223; 709/224
(58) Field of Classification Search .......... 709/220
See application file for complete search history.

(56) References Cited

U.S. PATENT DOCUMENTS

| 6,122,639 | A  | * | 9/2000  | Babu et al. .............. 707/103 R |
| 6,314,565 | B1 |   | 11/2001 | Kenner et al. |
| 6,662,205 | B1 | * | 12/2003 | Bereiter .................. 709/201 |
| 6,697,962 | B1 | * | 2/2004  | McCrory et al. ............ 714/27 |
| 7,020,697 | B1 | * | 3/2006  | Goodman et al. .......... 709/223 |
| 7,197,489 | B1 | * | 3/2007  | Gauvin et al. ................. 707/1 |
| 7,519,694 | B1 |   | 4/2009  | Arcot |
| 7,558,848 | B1 |   | 7/2009  | Shokhor |
| 2002/0019864 | A1 | * | 2/2002 | Mayer ....................... 709/223 |
| 2002/0144283 | A1 |   | 10/2002 | Headings et al. |
| 2003/0191911 | A1 | * | 10/2003 | Kleinschnitz et al. ....... 711/154 |
| 2004/0003266 | A1 | * | 1/2004 | Moshir et al. .............. 713/191 |
| 2004/0107125 | A1 | * | 6/2004 | Guheen et al. ................ 705/7 |
| 2005/0027846 | A1 | * | 2/2005 | Wolfe et al. ................ 709/223 |
| 2005/0071127 | A1 |   | 3/2005 | Mandal |
| 2005/0071730 | A1 |   | 3/2005 | Moyer et al. |
| 2005/0114176 | A1 | * | 5/2005 | Dominick et al. ............. 705/2 |
| 2005/0228819 | A1 |   | 10/2005 | Richards et al. |
| 2006/0070023 | A1 |   | 3/2006 | D'Souza et al. |
| 2006/0080656 | A1 | * | 4/2006 | Cain et al. .................. 717/174 |
| 2007/0061450 | A1 | * | 3/2007 | Burnley et al. ............. 709/224 |
| 2008/0046708 | A1 | * | 2/2008 | Fitzgerald et al. ............. 713/2 |
| 2008/0126773 | A1 |   | 5/2008 | Martinez et al. |

* cited by examiner

*Primary Examiner*—Hung T Vy
*Assistant Examiner*—Binh V Ho
(74) *Attorney, Agent, or Firm*—Morgan, Lewis & Bockius LLP

(57) ABSTRACT

A system that includes one or more clients, databases and servers. The clients communicate with the servers using hyper-text transfer protocol. Each client includes a scheduling and monitoring agent. Each server includes several components. A first server component performs a plurality of functions, including receiving requests from the client(s) for configuration file verification information and storing in the database(s) a log of the requests. A second server component is capable of performing a plurality of functions, including receiving hardware and software inventory information, as well as software metering statistics, and storing the inventory information in at least one of the databases.

5 Claims, 25 Drawing Sheets

```xml
<?xml version="1.0"?>
<HWIAConfig    xmlns:xsd=http://www.w3.org/2001/XMLSchema
               xmlns:xsi=http://www.w3.org/2001/XMLSchema-instance   >
    <WebServiceURL>
        http://LIC.GALAXY.Lehman.com/GalaxyDIP.asmx
    <WebServiceURL>
    <plugin-dll-list>
        <plugin-dll  name="ProcessorInfo.dll"
                     version="1.0.1952.29049"
                     creation-date="2005-04-27T15:16:23.1654945-04:00   >
            <dll-code>
[DDL CODE TO BE INSERTED HERE]
            </dll-code>
    </plugin-dll-list>
    <wmi-class-list>
        <wmi-class
            class-name="Win32_LogicalMemoryConfiguration" query-where="
            collect="true"
            <wmi-property-list>
                <wmi-property prop-name="TotalPageFileSpace" collect="true">
                    <postprocessing>$round(%1/1024,2)</postprocessing>
                    <target-datatype>Single</target-datatype>
                <wmi-property
                <wmi-property prop-name="TotalPhysicalMemory" collect="true">
                    <postprocessing>$round(%1/1024,2)</postprocessing>
                    <target-datatype>Single</target-datatype>
                </wmi-property>
            </wmi-property-list>
        </wmi-class>
    </wmi-class-list>
</HWIAConfig>
```

FIG. 2G

```xml
<?xml version="1.0"?>
<SWM_Config   xmlns:xsd=http://www.w3.org/2001/XMLSchema
              xmlns:xsi="http://www.w3.org/2001/XMLSchema-instance"
              WebServiceURL="http://nydeviis003:8670/GalaxyWSI_WS.asmx"
              WebServiceTimeout="10000"
              ReportingLatency="24"          >
<Extensions>
    <kExt name=".COM"/>
    <Ext name=".DLL"/>
    <Ext name=".EXE"/>
    <Ext name=".JAR"/>
    <Ext name=".OCX"/>
<Extensions?
<CollectFiles>
    <File name="ACCTNT.XLM"/>
    <File name="Acmain10.aw"/>
    <File name="ACOM.SYS"/>
    <File name="ascll.lib"/>
    <File name="ActiveUser32.reg"/>
    <File name="NVDVD.chm"/>
    <File name="NVS95"/>
    <File name="NW3AGNT.NLM"/>
    <File name="NW4AGNT.NLM"/>
    <File name="TrashKidReal.htm"/>
    <File name="trilian-v0.6351-e.rar"/>
    <File name="ZP4.INI"/>
    <File name="zshell.js"/>
    <File name="Zsy.vbe"/>
</CollectFiles>
```

FIG. 2I-1

```
<IgnorePaths>
    <Path name="\$NT"/>
    <Path name="\$xp"/>
    <Path name="\Backup"/>
    <Path name="\RECYCLER"/>
    <Path name="\System Volume Information"/>
    <Path name="\system32\dllcache"/>
    <Path name="\TEMP\"/>
    <Path name="\WINDOWS\Temp"/>
    <Path name="\WindowsUpdate"/>
    <Path name="\WINNT\Temp"/>
    <Path name="\Temporary ASP.NET Files"/>
    <Path name="\temporary internet files"/>
</IgnorePaths>
</SWI_Config>
```

FIG. 21-2

```xml
<?xml version="1.0"?>
<SWM_Config
    xmlns:xsd=http://www.w3.org/2001/XMLSchema
    xmlns:xsi="http://www.w3.org/2001/XMLSchema-instance"
    TraceStart="true"
    TraceRestrictions="true"
    TraceDLLs="false"
    RefreshInterval="256"
    WebServiceURL="http://LIC.GALAXY.Lehman.com/GalaxyDIP.asmx"
    WebServiceTimeout="10000">
    <Exe-optional-fields
        FileVersion="false"
        FileLength="false"
        Language="false"
        ProductName="false"
        ProductVersion="false"
        EXEPath="false"
        CMDLine="false"                  />
    <Dll-optional-fields
        FileVersion="false"
        FileLength="false"
        Language="false"
        ProductName="false"
        ProductVersion="false"
        DLLPath="false"
        EXEName="false"
        EXEFileVersion="false"
        EXEPath="false"                  />
    <WarningMessage>
        <MsgTitle>This is a restricted application</MsgTitle>
        <MsgText>
            {EXENAME} This application is restricted and has been terminated!
        </MsgText>
    </WarningMessage>
    <EmailMessage mailhost="mailhost">
        <Subject>Restricted Application Launched {EXENAME}</Subject>
        <MsgBody>
            Restricted Application {EXENAME} was launched by {OWNER} on
            machine {MACHINENAME} at {IPADDRESS}
```

FIG. 2K-1

```
</MsgBody>
<to-list>
    <recipient>azarenin@lehman.com</recipient>
    <recipient>abelugin@lehman.com</recipient>
    <recipient>ybernadskii@lehman.com</recipient>
</to-list>
</EmailMessage>
<Restricted>
<Module name="BDE3D_REF2.DLL" ka="Report"/>
<Module name="BDEDATA2.DLL" ka="Report"/>
<Module name="BDEDOWNLOADER.DLL" ka="Report"/>
<Module name="BDEFDI.DLL" ka="Report"/>
<Module name="BDEIMAGE.DLL" ka="Report"/>
<Module name="BDEINSTA2.DLL" ka="Report"/>
<Module name="BDEINSTALL.EXE" ka="Report"/>
<Module name="BDELOAD2.DLL" ka="Report"/>
<Module name="BDEPLAYER2.DLL" ka="Report"/>
<Module name="BDERASTDX6_30002.DLL" ka="Report"/>
<Module name="TRILLIAN.EXE" ka="Report"/>
<Module name="XTSEARCH.DLL" ka="Report"/>
<Module name="XTUPDATE.DLL" ka="Report"/>
<Module name="XUPITERTOOLBAR.DLL" ka="Report"/>
</Restricted>
<Ignored>
<Module name="ACCWIZ.EXE"/>
<Module name="ACE.EXE"/>
<Module name="ACREGL.EXE"/>
<Module name="ACROFILL.API"/>
<Module name="ACROFORM.API"/>
<Module name="ACTCNC.EXE"/>
<Module name="ACTIVE SYNC.EXE"/>
<Module name="ACTSAVER.SCR"/>
<Module name="ACSETUP.EXE"/>
<Module name="ADBC.API"/>
<Module name="ADMINPAK.EXE"/>
<Module name="ACMPLUGIN.APL"/>
<Module name="ADS.EXE"/>
```

FIG. 2K-2

```
<Module name="XSTART.NLS"/>
<Module name="Y2KSETUP.EXE"/>
<Module name="ZEXTRACT.EXE"/>
<Module name="ZGJOKL.EXE"/>
<Module name="ZOOMIN.EXE"/>
<Module name="ZUSCKR.EXE"/>
</Ignored>
</SWM_Config>
```

FIG. 2K-3

METHOD AND SYSTEM FOR IDENTIFYING AND CONDUCTING INVENTORY OF COMPUTER ASSETS ON A NETWORK

CROSS REFERENCE TO RELATED APPLICATIONS

This application claims priority to U.S. Provisional Patent Application Ser. No. 60/832,420 filed Jul. 21, 2006, entitled "Method and System for Identifying and Conducting Inventory of Computer Assets on a Network", which is hereby incorporated by reference in its entirety.

FIELD OF THE INVENTION

The present invention relates to identifying and conducting an inventory of computer assets on a network.

BACKGROUND OF THE INVENTION

In a modern corporation, computer-related assets carry significant cost. The dynamic nature of application and system software dictates the need for periodic upgrades and/or replacements of the hardware. A blanket approach—i.e., upgrade all machines—may carry with it prohibitive cost. Thus comes the necessity to collect a detailed and timely inventory of the hardware components of the corporate computers as a basis for the targeted upgrade and replacement decisions.

Today's computers include a multitude of expensive components, like video or sound cards, external CD/DVD readers/burners, LCD monitors, docking stations, etc, which can be transferred or reallocated independently of the main computer unit. Improper or unauthorized transfer of these components may incur significant cost to the company. To avoid or mitigate this cost, a desired inventory solution should be able to properly identify and inventory a variety of components and devices representing or attached to the computer. This solution should also be flexible enough to provide a mechanism for inventorying hardware and software components unknown at the time of the design or initial implementation of the desired inventory solution.

Computers are designed to run system and application programs. The nature of computer programs is such that they may have bugs, which manifest themselves only under certain circumstances on particular configurations of hardware and software components. To identify and mitigate these occurrences, it is important to have a detailed and timely inventory of the hardware and software components comprising the computing environment of a corporation. The same pertains to identification and isolation of some forms of malicious software (i.e., computer viruses).

A significant portion of the cost associated with the management of a computer network represents license fees paid to the manufacturers of the application software deployed on the corporate computers. Thus, it becomes an important part of cost management to properly account for various software components installed on corporate computers and cross-reference software installation with the actual software usage.

Corporate computer networks are usually geographically distributed with various segments that interconnected using some control mechanisms, such as protocol filtering, firewalls, etc. A corporate-wide computer assets inventory system should be able to transparently bridge various network segments and consolidate all inventory information for centralized analysis.

Existing pure inventory or inventory-capable systems fall short of embracing all of the requirements stated above. Thus, there exists a need in the prior art for a method and system to identify and conduct an inventory of computer assets on a network that provides for greater scalability, more flexibility in terms of logging and error discovery, and the ability to communicate through firewalls, if necessary.

SUMMARY OF THE INVENTION

The present invention is directed to a system that includes one or more clients, databases and servers. The clients communicate with the servers using hyper-text transfer protocol. Each client includes a scheduling and monitoring agent. Each server includes a component that performs a plurality of functions, including receiving requests from the client(s) for configuration file verification information and storing in the database(s) a log of the requests. Each server also includes a component that is capable of performing a plurality of functions, including receiving hardware and software inventory information, as well as software metering statistics, and storing such information in the database(s).

Another aspect of the invention is directed to a method for collecting computer asset information on a network in accordance with a configuration file. The method operates in a system that includes one or more clients (that include a hardware inventory agent), servers, and databases communicating over the network. In connection with the method, a checksum of the configuration file is generated. The checksum is submitted to the server(s) over the network for verification, which includes comparing the checksum to current client configuration information stored in the database(s). If the verification produces a negative result, a current configuration file is requested from the server(s). The configuration file includes processing instructions and a component extending a capability of the hardware inventory agent.

Another aspect of the invention is directed to a method operating in a system that includes one or more clients (including a scheduling agent), servers, and databases, communicating over a network. In connection with the method, computer asset information is collected and reported to the server(s). The computer asset information is stored in the database(s). The collecting is performed in accordance with a schedule executed by the scheduling and monitoring agent. The schedule is downloaded by the server(s) to the client(s).

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

In the drawings:

FIG. 2G provides a sample of the configuration file corresponding to the configuration file node hierarchy of FIG. 2F;

FIG. 2I provides a sample of the configuration file corresponding to the configuration file node hierarchy of FIG. 2H;

FIGS. 2K-1-2K-3 provide a sample of the configuration file corresponding to the configuration file node hierarchy of FIG. 2J;

FIG. 3 illustrates an exemplary framework for the server-side of the inventive system;

DETAILED DESCRIPTION OF THE PREFERRED EMBODIMENTS

The present invention comprises a set of server-based and client-based services that provide a flexible and expandable mechanism for discovering and conducting inventory of computer assets on a network.

Figure 1A:
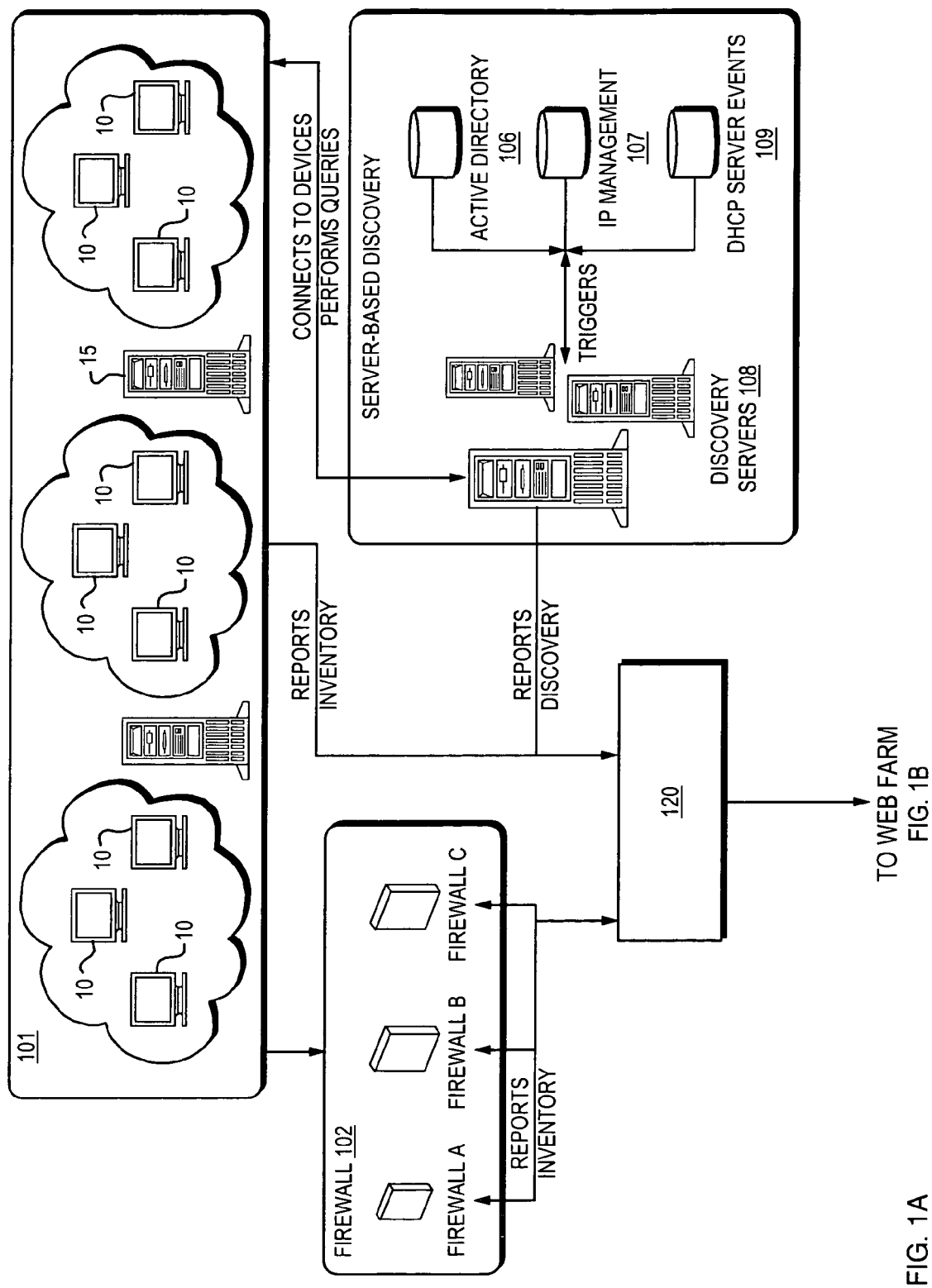
FIGS. 1A and 1B illustrate a logical overview of an exemplary system architecture.
Figure 1B:
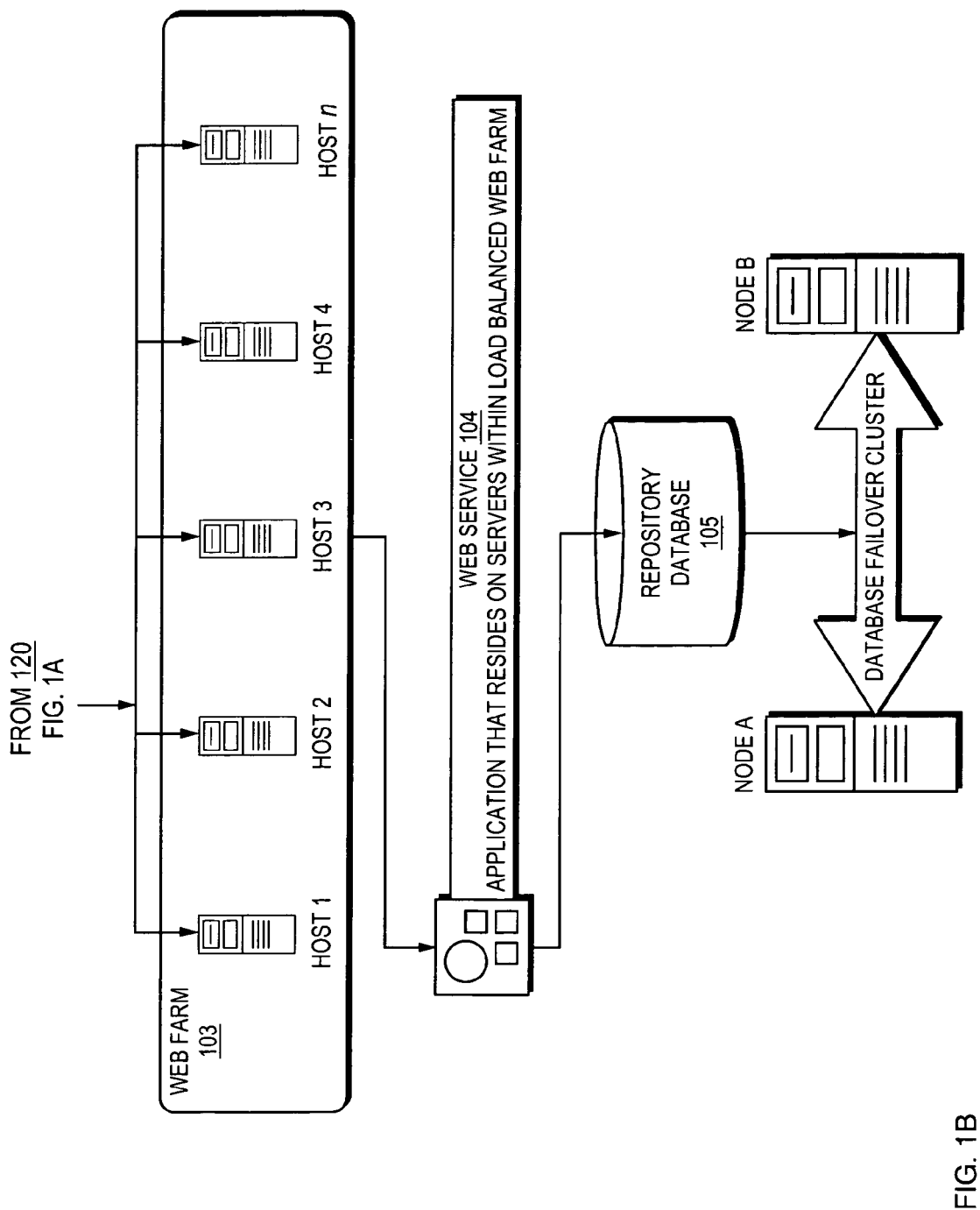

FIGS. 1A and 1B provides a logical overview of an exemplary system architecture. The exemplary system includes numerous software and hardware components and resides in multiple infrastructure tiers. The inventive system is presented on the client-side 101 of the infrastructure in the form of software applications (referred to herein as "Client Agents"), designed to run as Windows Services and installed on the workstations 10 and servers 15 within an organization. Each Client Agent is designed to carry tasks related to gathering of various inventory data points. Client Agents communicate to server-side components by executing methods of the Web Service application 104. They use HTTP protocol connections over Port 80 for all communications with Web Services 104.

Computers running Client Agents that reside outside of the organization's core domain, or that reside in domain but do not have a trust relationship established with the core domain, communicate through the firewall 102 using policy-driven proxies.

The server-side environment of a preferred embodiment of the inventive system includes numerous software and hardware components as well. In order to abstract physical addresses of back-end servers and to ensure high availability of services, virtual addresses (i.e., VIPs) are used. Web Services 104 is a software application that resides on the Web Farm 103. It provides a number of web methods that support various functionalities of the Client Agents used in connection with the invention. To ensure maximum availability and compatibility with clients, Web Services 104 is designed to support communication using HTTP protocol over port 80. The two main functions of the Web Service application 104 are (1) providing configurations and settings to Client Agents, and (2) handling inventory data submissions from Client Agents, and saving data to database 105. The Web Farm 103 is used to ensure high availability and scalability of Web Services 104 for consumption by the Client Agents.

A server-based software application (discovery servers 108), implemented as a Windows service in the preferred embodiment, provides supplemental discovery of devices running the Windows Operating System on the network. Discovery is triggered by events in several disparate systems, such as Active Directory 106, IP management systems 107, and Event Log messages collected on DHCP servers 109. Upon triggering, the application connects to a specific client computer system and executes a set of query to collect necessary information. The collected information is submitted to database via the Web Service 104.

The database 105 stores run-time configurations for Client Agents and stores inventory collected by Client Agents.

Figure 2A:
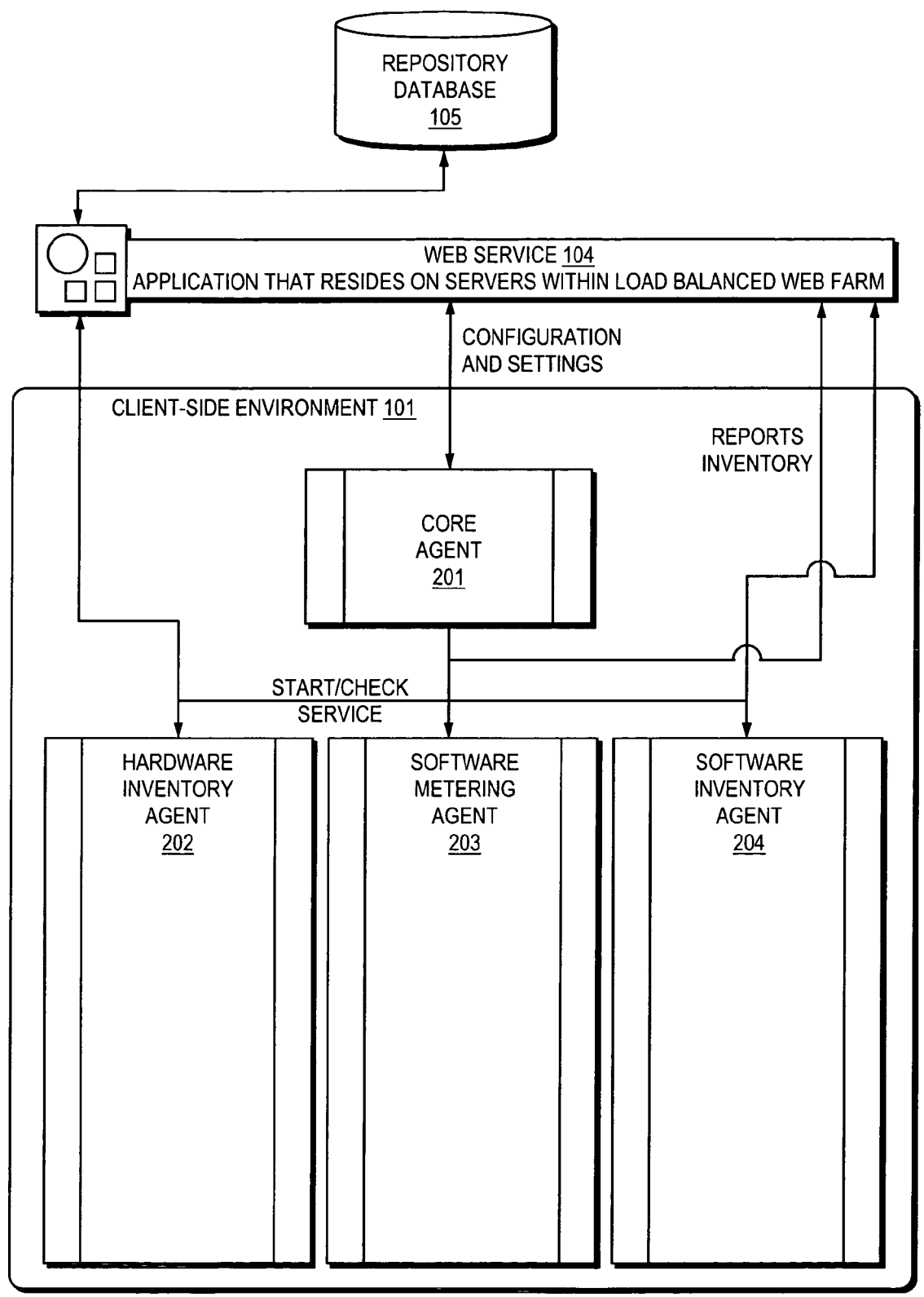
FIG. 2A illustrates the client-side components of the inventive system and their interaction with the server-based components.

With reference to FIGS. 2A, 2B, 2C, 2D, and 2E, the Client Agents are described in more detail. FIG. 2A provides a high level overview of the client-side components 101 and their interaction with the server-based component. As discussed above, the inventive system is presented on the client-side of an organization's infrastructure in the form of software applications (i.e., Client Agents), designed to run as Windows Services and installed on the Windows workstations and servers in the organization. Each Client Agent carries out various tasks related to gathering of various inventory data points and runs as a Windows Service. The type of the Client Agent employed determines the startup mode of the corresponding service. The following Client Agents comprise the client-side environment of the preferred embodiment of the inventive system.

Figure 2B:
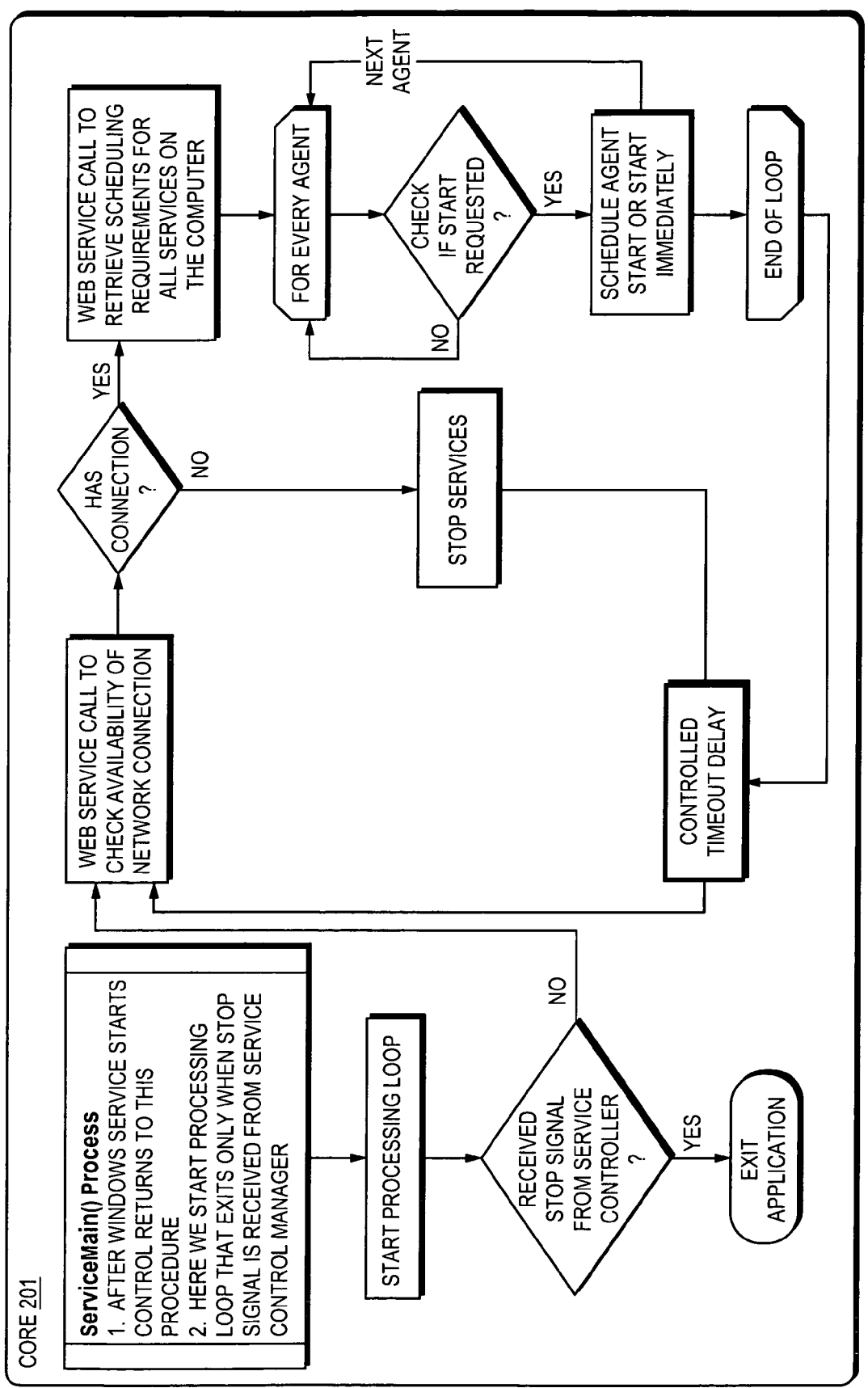
FIG. 2B illustrates one of the client agents used in connection with the present invention.

With reference to FIG. 2B, the Core Agent 201 is described. The Core Agent is a software application that is installed on the client computer as Windows Service. It is configured to run in Automatic startup mode. The primary function of the Core Agent 201 is to provide scheduling services for other Client Agents. The Core Agent 201 also checks on the availability of a network connection and, when a connection is unavailable, stops the Client Agents that are in Automatic startup mode, such as Software Metering Agent 203 described below. The Core Agent 201 periodically submits a Web Service request to check statuses of other Client Agents that are in manual startup mode. Depending on the status received for a specific agent, the Core Agent 201 can schedule a launch of that agent within a short random time interval or immediately, or do nothing. Thus, if data points are needed immediately, or at a time that is not within the scheduled processing, the Core Agent 201 can be used to activate the Hardware Inventory Agent ("HWI Agent") 202, described below.

Figure 2C:
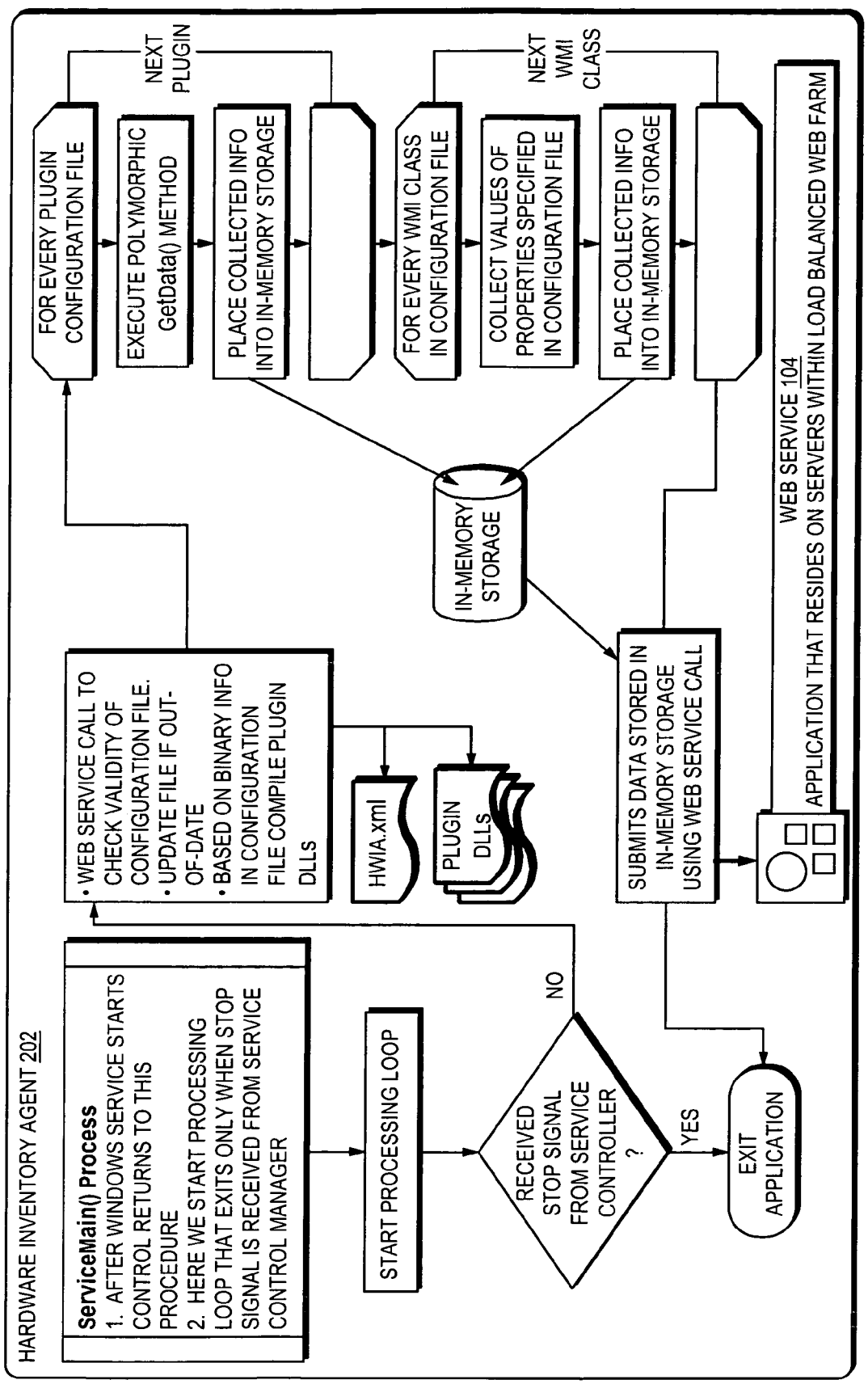
FIG. 2C illustrates one of the other client agents used in connection with the present invention.

With reference to FIG. 2C, the HWI Agent 202 is described. The HWI Agent 202 is a software application that is installed on a client computer as Windows service. It is configured to run in manual startup mode and is invoked by the Core Agent 201 any time the Core Agent 201 receives a request for information to be updated. The frequency of updates is controlled server-side in the database 105. HWI Agent 202 collects and reports computer hardware and configuration information in accordance with a configuration file. Using WebService calls, it checks the validity of the current configuration file that is stored on the client 10; if the file fails the test, a new version of the configuration is requested and stored on the client 10. The configuration file carries a list of data collection points expressed in the form of WMI classes and properties. The configuration file also contains tidbits of code—plugins—each designed to collect particular types of information. Collected information is submitted using methods of Web Service 104.

The particular way in which the HWI Agent 202 checks its configuration file, in the preferred embodiment, is as follows. The HWI Agent 202 takes the check sum of the current configuration file on stored on the client 10. It sends its own signature to the server and asks the server if its configuration file is current. The server checks the current configuration file for the client in the central database and calculates its checksum. If the checksums match, it sends a message back to the HWI Agent 202 indicating the same. If the checksums do not match, it sends a message back to the HWI Agent 202, indicating a rejection. The HWI Agent 202 then requests updates to the configuration file.

Thus, the HWI Agent 202 receives the configuration file, extracts the DDL from the file, stores it locally on the client, and executes the DDLs, which control what information will be collected.

Figure 2D:
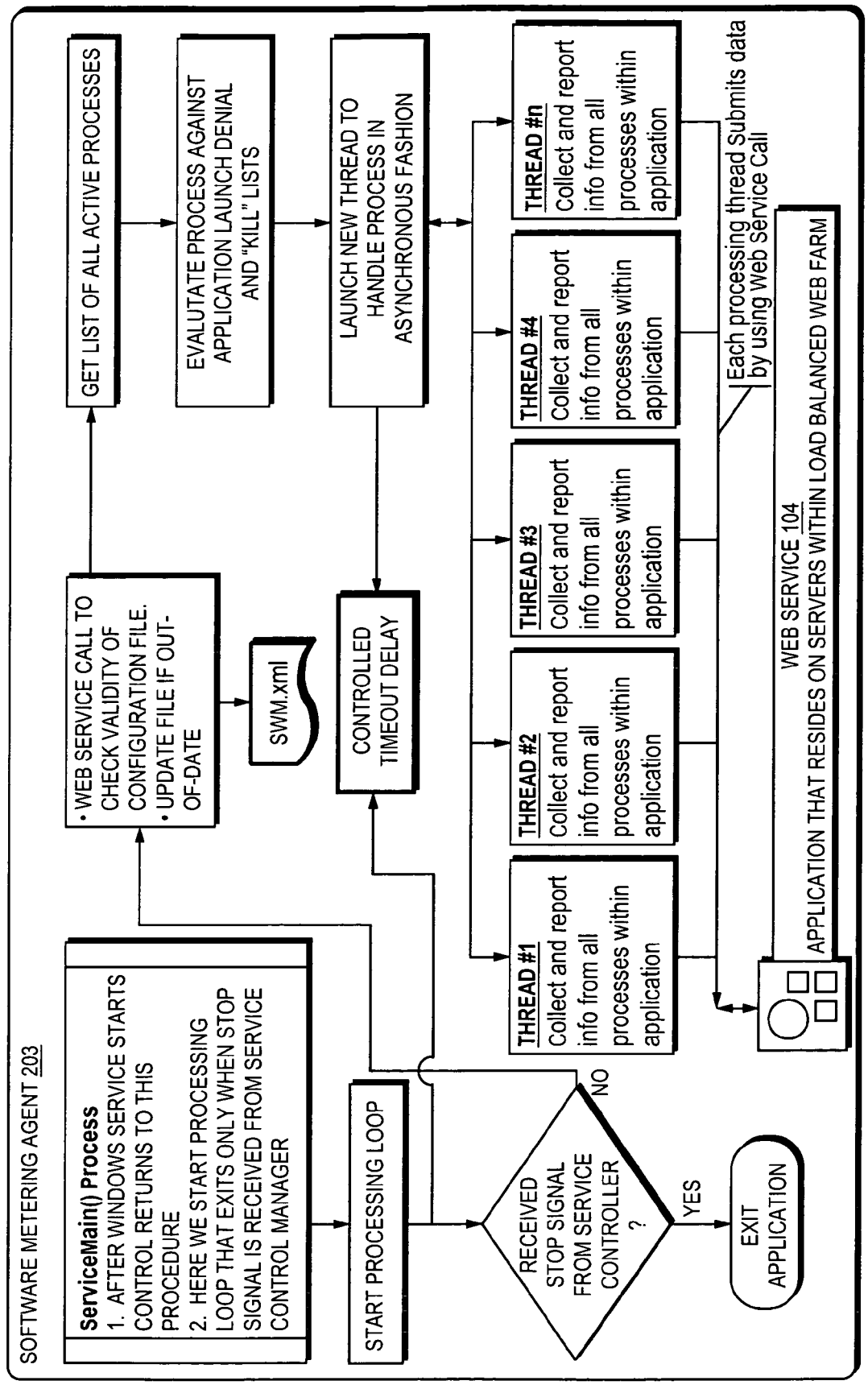
FIG. 2D illustrates one of the other client agents used in connection with the present invention.

With reference to FIG. 2D, the Software Metering Agent ("SWM Agent") 203 is described. SWM Agent 203 is a software application that is installed as a Windows service. It is configured to run in automatic startup mode. SWM Agent 203 collects and reports granular information on software utilization in the client environment. In particular, it monitors and controls software utilization on a user's workstation 10. It periodically checks the validity of its configuration file through Web Service calls to keep the locally stored configuration file up-to-date. Based on configuration settings, it can prevent certain processes from running and/or provide various means of notification and escalation. Collected inventory information is submitted to the server-side of the environment through Web Service calls.

Figure 2E:
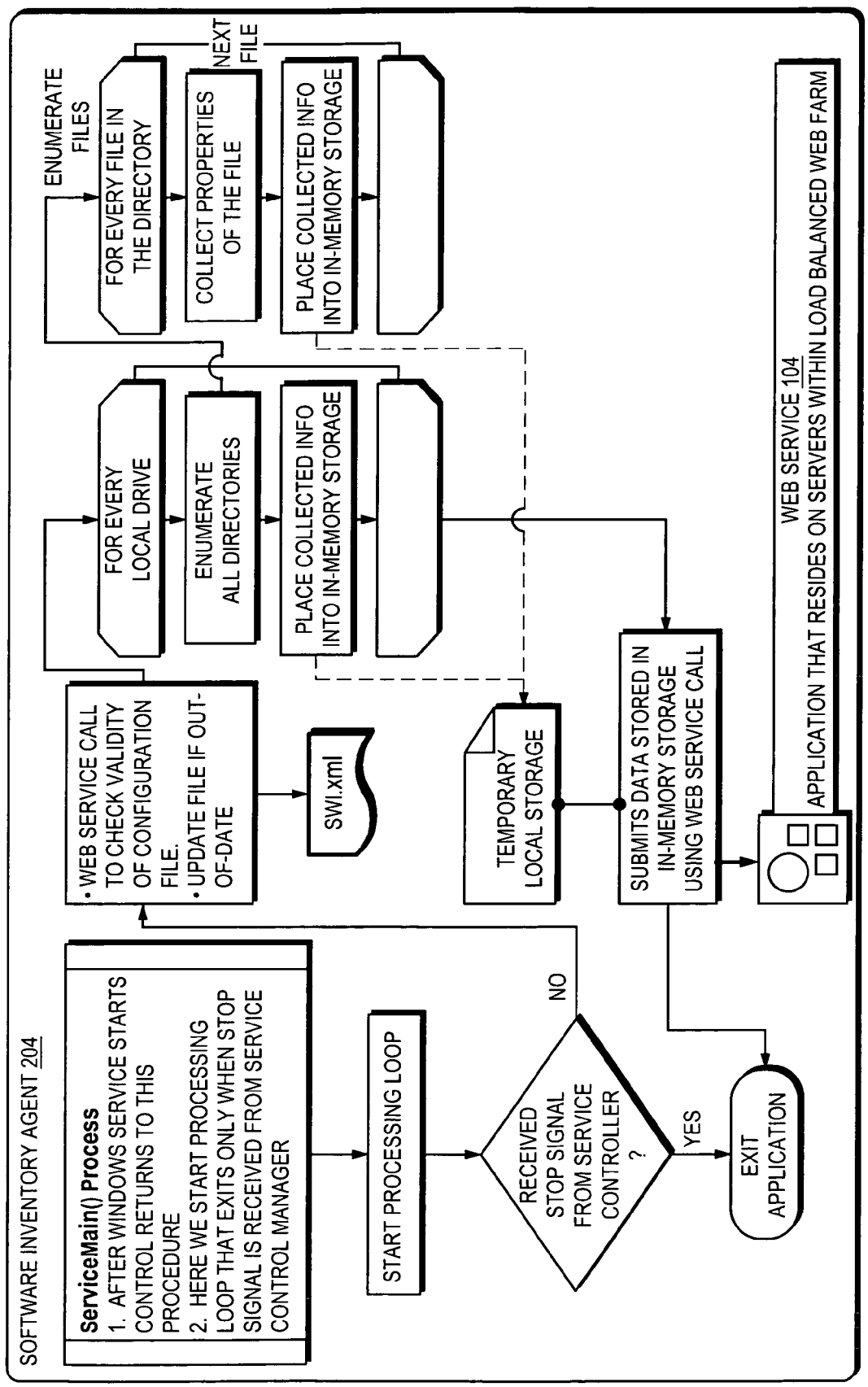
FIG. 2E illustrates one of the other client agents used in connection with the present invention.

With reference to FIG. 2E, the Software Inventory Agent ("SWI Agent") 204 is described. The SWI Agent 204 is a software application that is installed as a Windows service. It is configured to run in manual startup mode and is invoked by the Core Agent 201. The objective of this agent is to collect information required by the server-based License Compliance Evaluation application. Subject to an exception list stored in the configuration file, the SWI Agent 204 collects information about every directory and file present on client computer 10. It uses Web Service calls to report collected information.

As described above, the operation of Client Agents is controlled by the corresponding configuration files delivered to the clients 10 in response to configuration verification from the data repository 105. In the preferred embodiment, configuration files for all client components adhere to the XML version 1.0 specification.

Figure 2F:
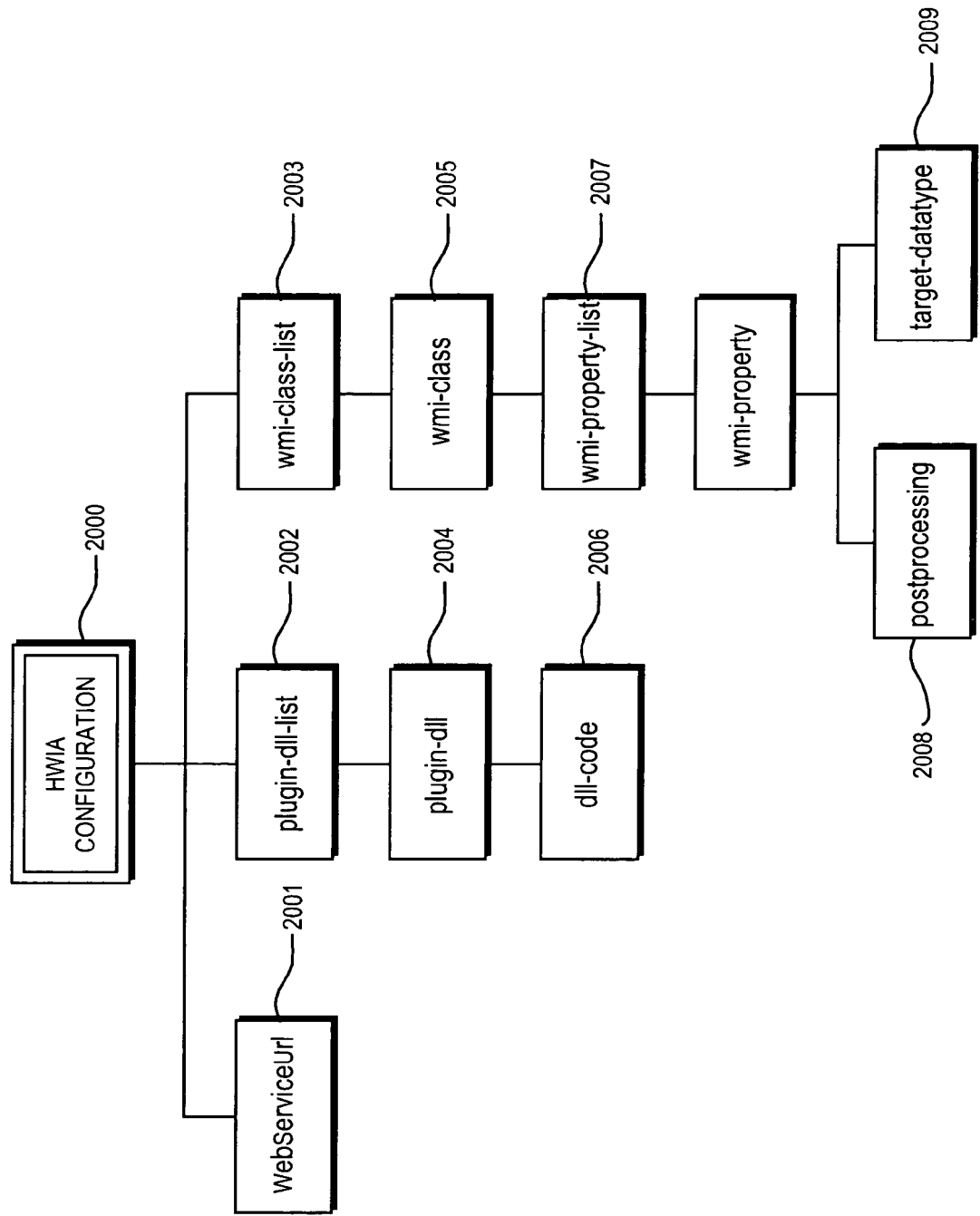
FIG. 2F illustrates the configuration file node hierarchy for one of the agents used in connection with the present invention.

A preferred embodiment of the configuration file node hierarchy for the HWI Agent 202 is shown in FIG. 2F. The HWIA Config node 2000 is the root node of the XML hierarchy and defines the XML file schema. The WebServices URL node 2001 defines the URL for reporting the hardware inventory. The plugin-ddl-list node 2002 is the root node for the list of plugin DDLs. The plugin-ddl node 2004 is the root node for the description of individual plugin DDLs. This node defines the plugin name, version and creation date. The ddl-code node 2006 provides code of the plugin DDL in bit 64 encoding. The wmi-class-list node 2003 is the root node of the list of WMI classes. The wmi-class node 2005 is the root node of the individual WMI class descriptions. This specifies the class name, class query condition, and whether to collect or ignore the class. The wmi-property-list node 2007 is the root node of the definition of a property of the WMI class. This node specifies the property name and whether to collect or ignore the property. The postprocessing node 2008 defines the post-processing operation to be performed on the value of the property prior to reporting it back. The target-datatype node 2009 defines the target data type for the property value. A sample of the HWIA 202 configuration file defining one plugin DDL and one WMI class to be collected is shown in FIG. 2G.

Figure 2H:
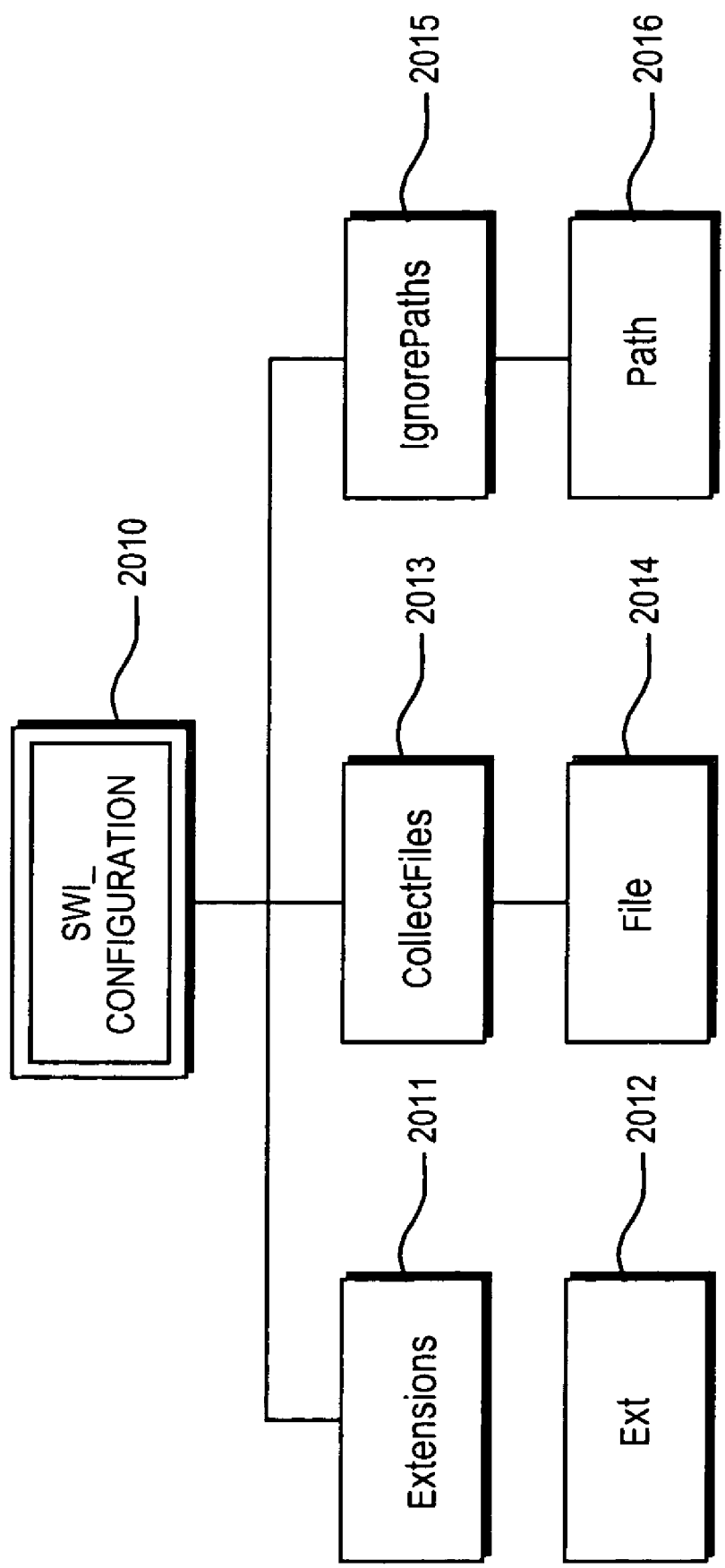
FIG. 2H illustrates the configuration file node hierarchy for one of the agents used in connection with the present invention.

A preferred embodiment of the configuration file node hierarchy for the SWI Agent 204 is shown in FIG. 2H. The SWI_Config root node 2010 of the XML hierarchy defines the XML file schema, the URL for reporting software inventory, the timeout value, and the reporting latency. Extensions node 2011 is the root node for the list of file extensions to be inventoried. Ext node 2012 identifies the files to be inventoried (if found on the client machine). CollectFiles node 2013 is the root node of the list of individual files to be inventoried. File node 2014 is the name of the file to be inventoried (if found on the client machine). IgnorePaths node 2015 is the root node of the list of directories to be ignored while scanning the hard drive for files to be inventoried. Path node 2016 is the directory to be ignored while scanning the hard drive for files to be inventoried. FIG. 2I illustrates a sample of the SWI Agent 204 configuration file defining files/directories to be inventoried.

Figure 2J:
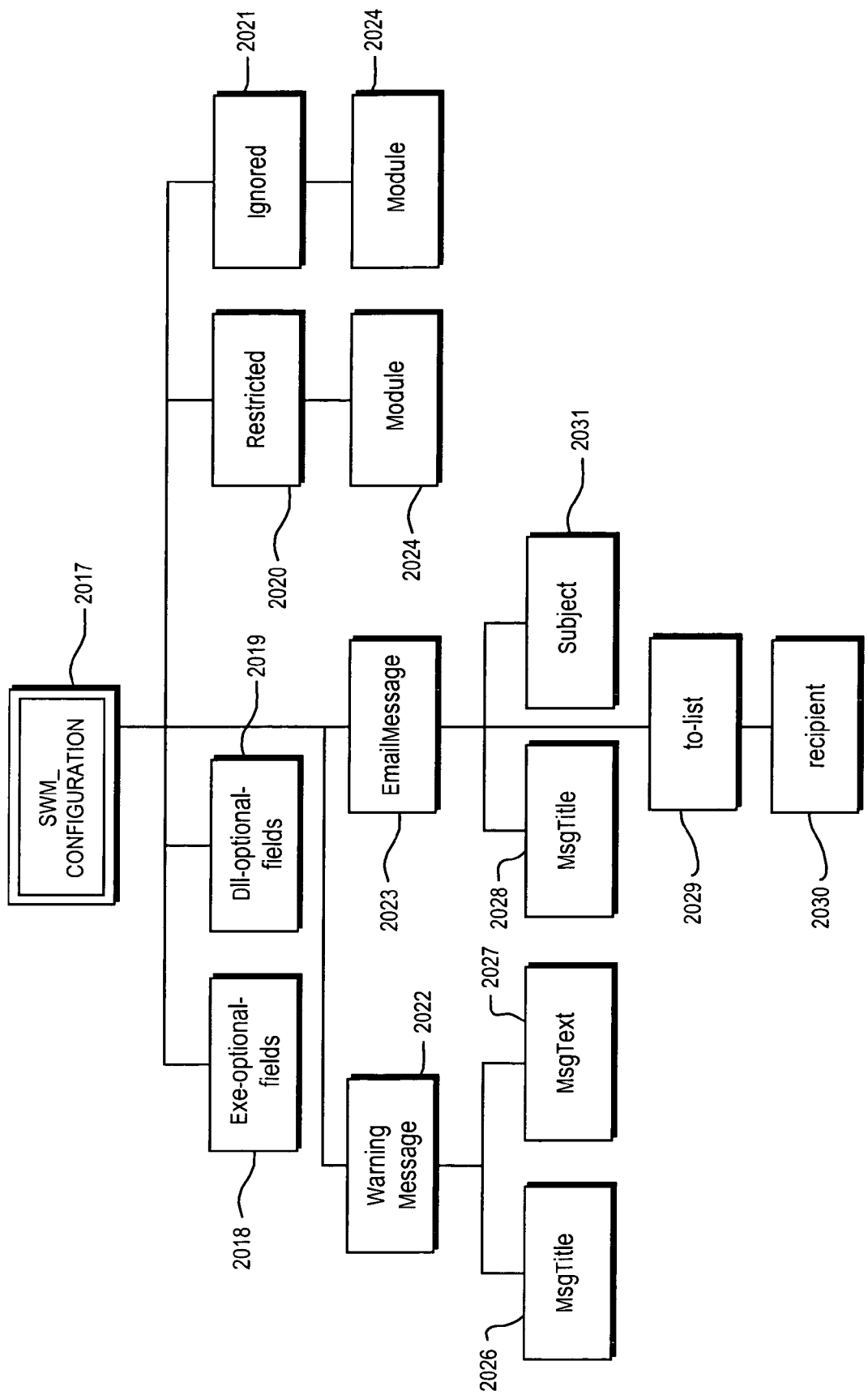
FIG. 2J illustrates the configuration file node hierarchy for one of the agents used in connection with the present invention.

A preferred embodiment of the configuration file node hierarchy for the SWM agent 203 is shown in FIG. 2J. SWM_Config node 2017 is the root node of the XML hierarchy, which defines the XML file schema, the URL for reporting software metering, reporting timeout, tracing options, and processing table refresh intervals. Exe-optional-fields node 2018 provides indicators as to whether to collect optional fields for the executables. Dll-optional-fields node 2019 provides indicators as to whether to collect optional fields for the DLLs. WarningMessage node 2022 is a root node providing for the warning message definition. MsgTitle node 2026 provides the title of the warning message. MsgText node 2027 provides the text of the warning message. EmailMessage node 2023 is the root node for the e-mail message, which defines the mail host to be used for sending e-mails. MsgBody node 2028 provides the body of the e-mail message. Subject node 2031 provides the subject of the e-mail message. To-list node 2029 is the root node of the recipients list for the e-mail message. Recipient node 2030 provides the recipient address for the e-mail message. Restricted node 202 is the root node for the list of restricted executables/DLLs. Module node 2024 is the module name for the restricted executable/DLL. Ignored node 2021 is the root node for the list of ignored executables/DLLs. Module node 2024 provides the module name for the ignored executable/DLL. FIGS. 2K-1 and 2K-2 illustrate a sample of the SWM Agent 203 configuration file.

Figure 3:
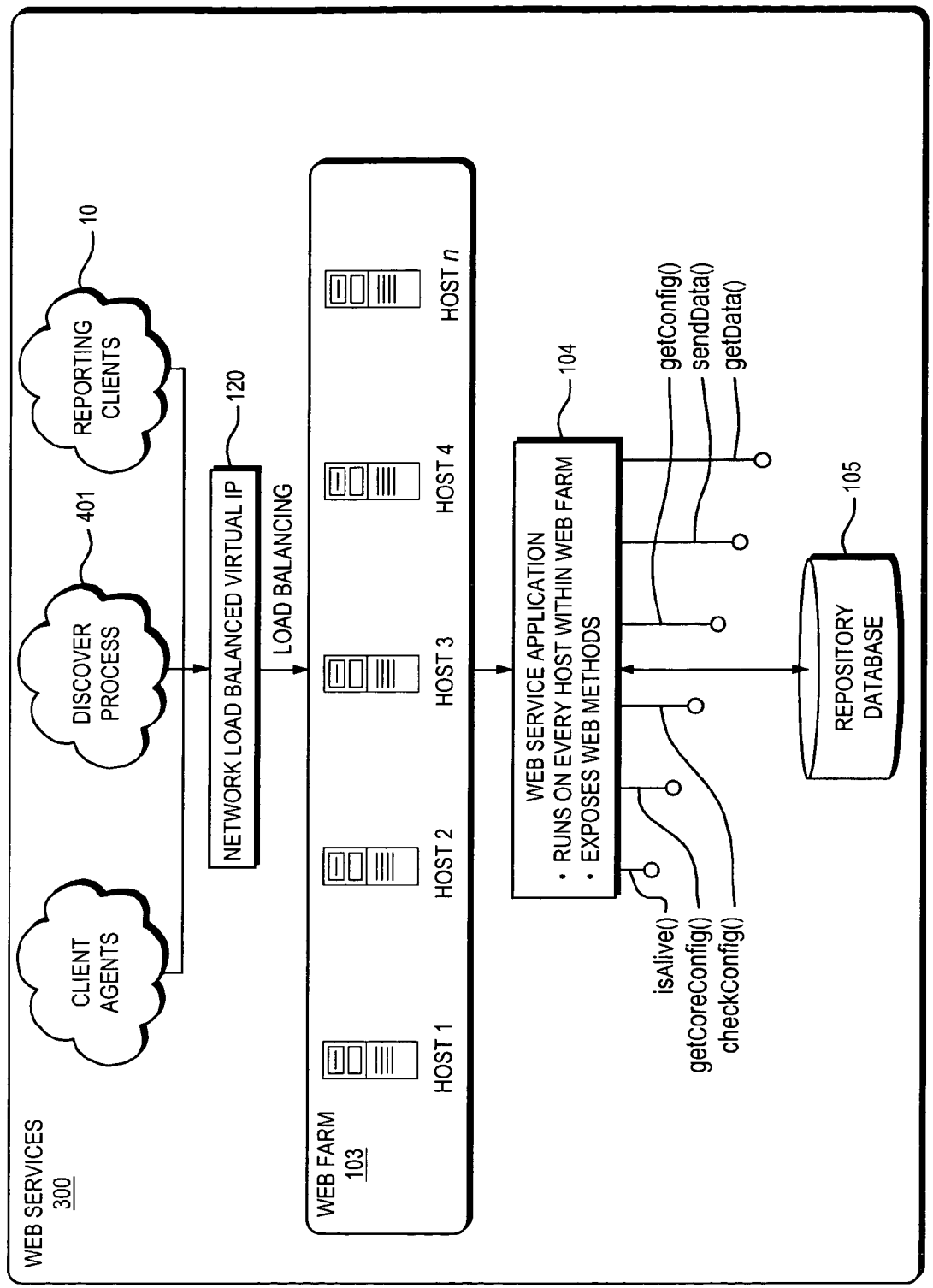

FIG. 3 shows a preferred embodiment of the framework for the server-side of the inventive system. Web Services 300 is a .NET, web-based software application framework that provides the ability to connect and pass data between Client Agents and the server-side environment. Communication is carried out using HTTP protocol over Port 80, which increases chances of availability to various clients 10 connecting through disparate network mechanisms. Web Services 300 includes a number of different services, called Web Methods, that provide diverse functionalities to Client Agents, as follows:

1. IsAlive( )—Web Method allowing agents to check on availability of connection to Web Services 300.
2. GetCoreConfig( )—Web Method used by the Core Agent 201 to retrieve settings and configurations for various other Client Agents.
3. CheckConfig( )—Web Method used by Client Agents to check validity of their current configuration file.
4. SendData( )—Web Method used by Client Agents as well as by server-based discovery processes to submit collected inventory and discovery information.
5. GetData( )—Web Method that provides generic access to reporting data to various clients.

To ensure a high level of availability and scalability, Web Services application 104 is deployed on Web Farm 103, which includes multiple servers running an Internet Information Server.

Figure 4:
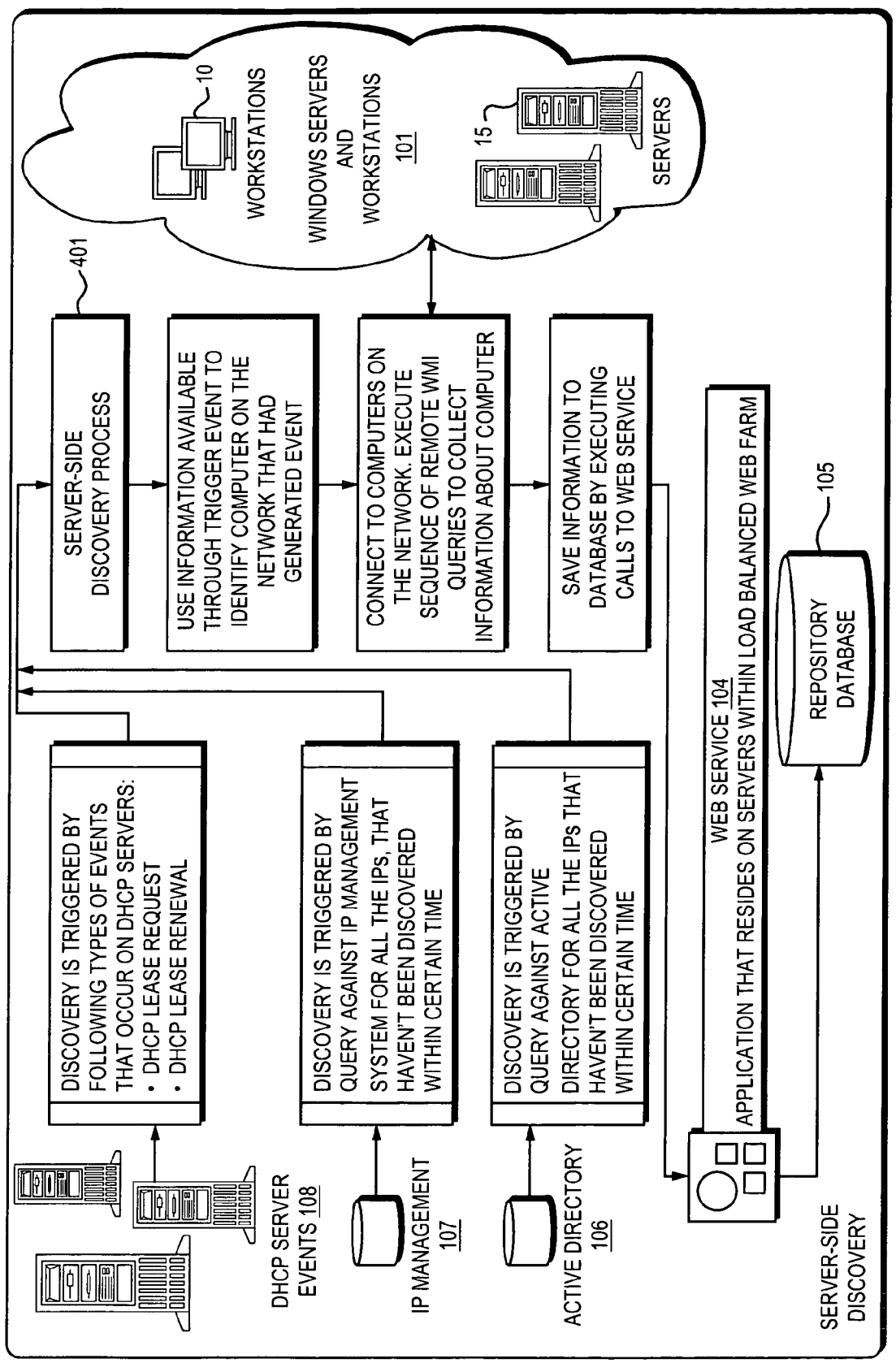
FIG. 4 is a diagram illustrating the server-side discovery process.
Figure 5A:
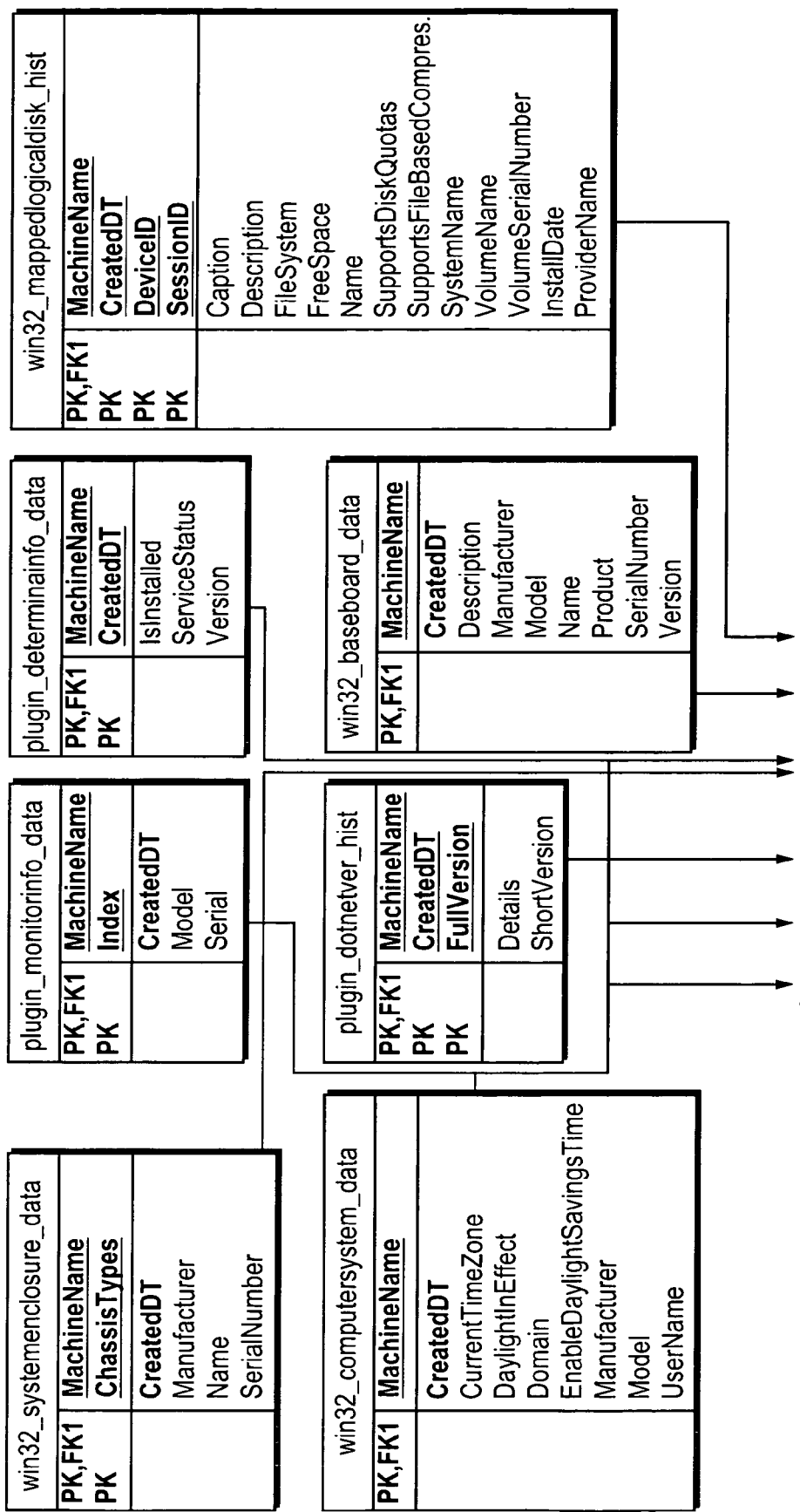
FIG. 5 provides an exemplary schema of data objects used in connection with the present invention.
Figure 5B:
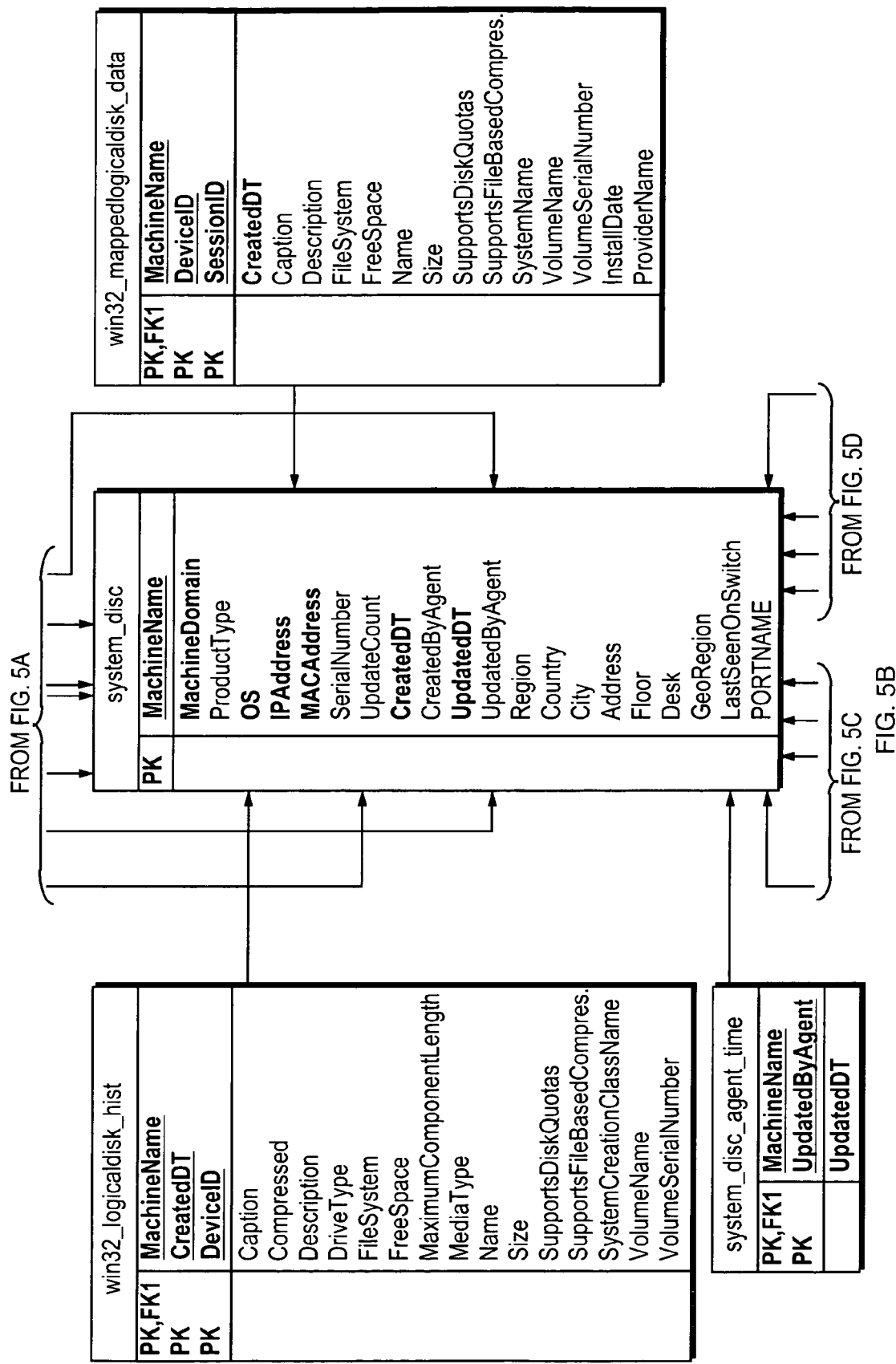
Figure 5C:
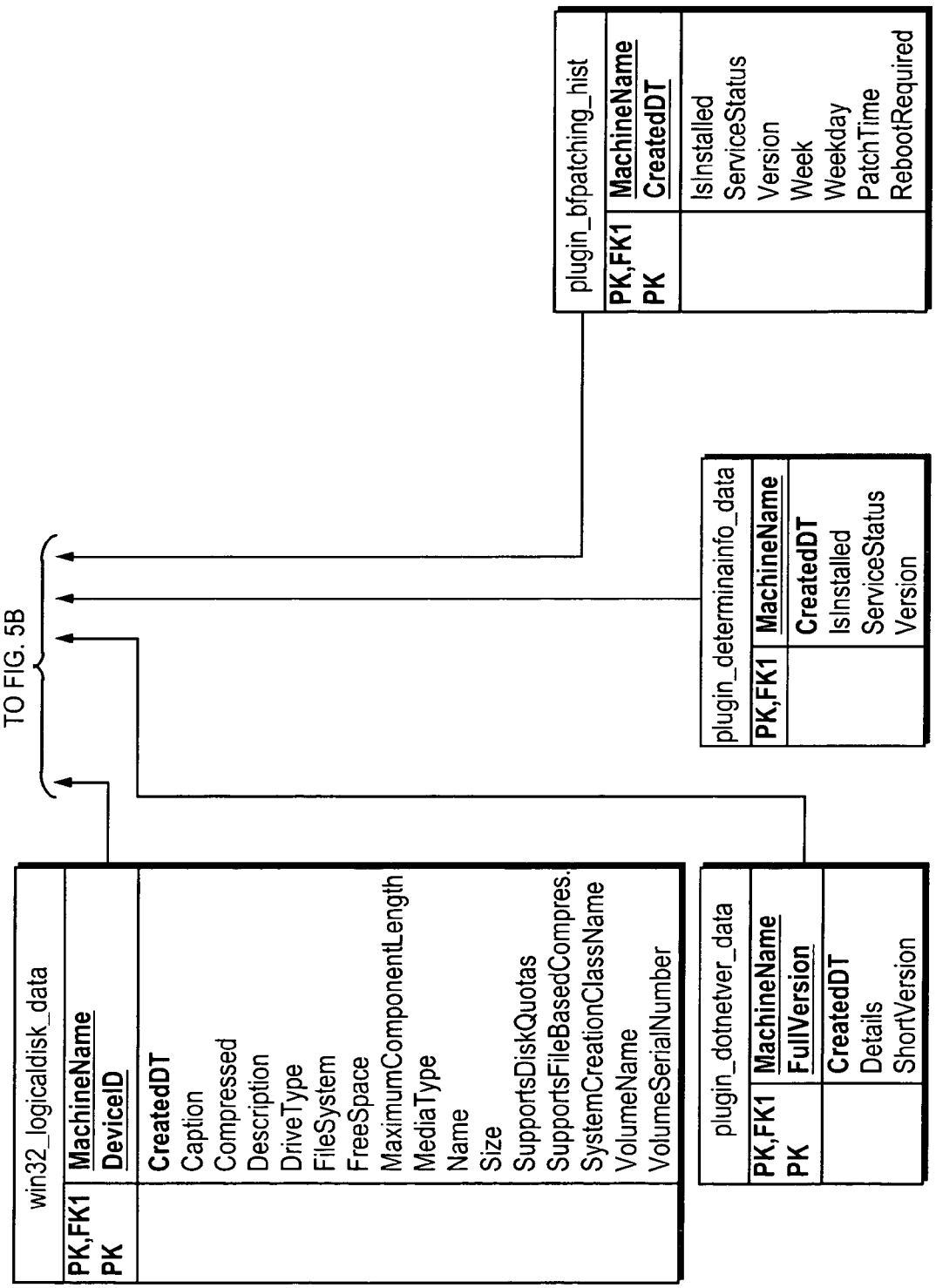
Figure 5D:
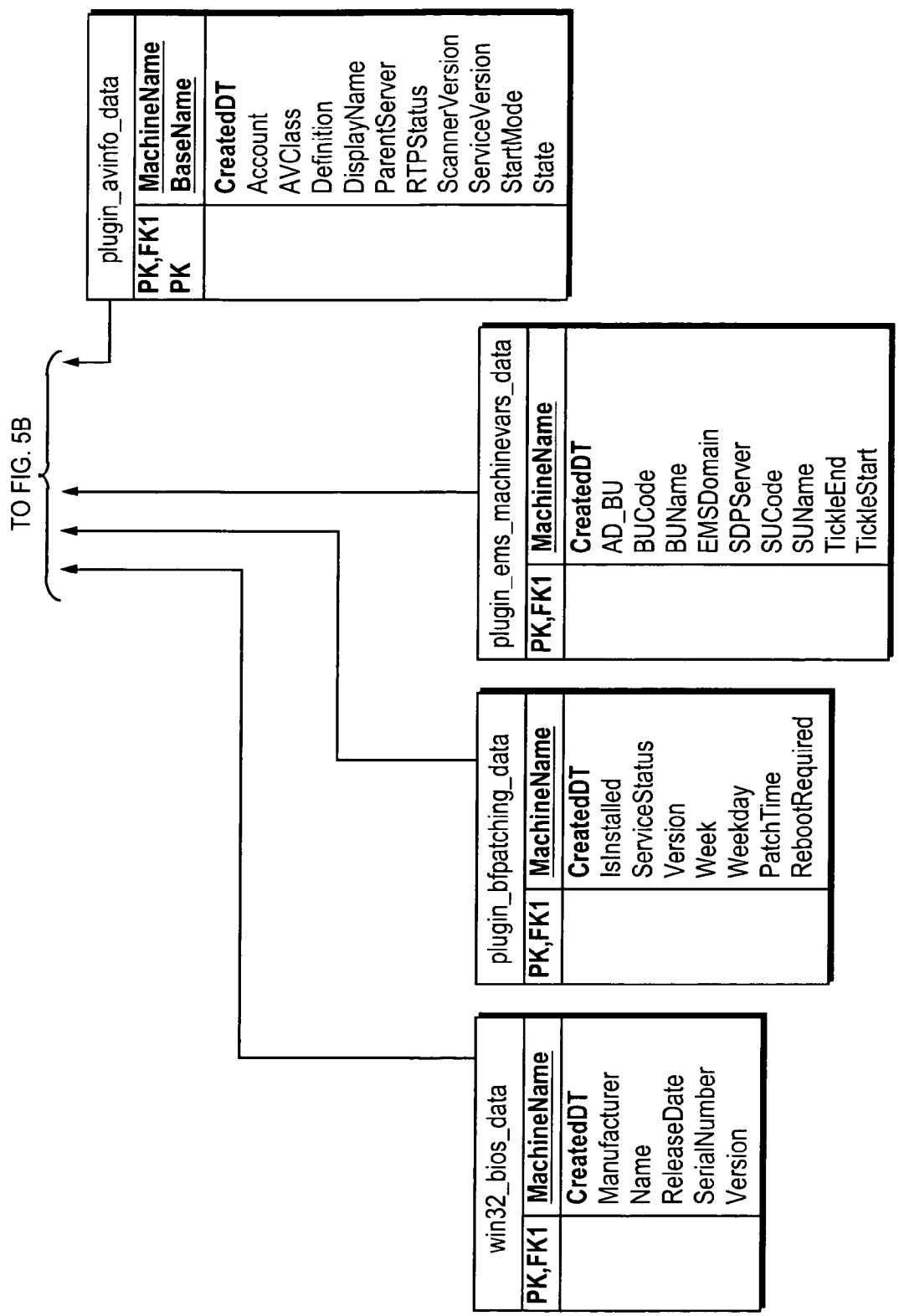

With reference to FIG. 4, the server-side discovery process is described. Server-side discovery process 401 is a server-based software application, implemented as Windows service, designed to provide supplemental discovery of end-point devices running the Windows Operating System on the network. Discovery is triggered by events in several disparate systems, such as, by way of example, Active Directory 106, IP management systems 107, and Event Log messages collected on DHCP servers 109. Upon triggering, the application connects to a specific client computer system, and executes a set of queries to collect necessary information. Collected information is then submitted to database 105 via Web Services 104.

To support and to work in conjunction with the exemplary embodiment of the present invention, an original database design has been developed. Two distinct model types exist within the database 105 to meet distinctive requirements of various software application components of the invention.

First described is the system and applications model. This set of database objects is used by software applications within system to store and retrieve various application-specific settings and configurations. A number of database entities within this section, and the relationships among them, allow storing and maintaining entitlement information related to the configuration setting.

Next described is the inventory data model. This set of database entities is designed to store diverse inventory data collected by various software application components within the system. It supports an exceptionally high volume of database transactions and minimizes the potential for contention on database resources. This model combines two database design approaches which, combined provide for highly scalable and responsive system, as follows. A traditional relational database design is used, which facilitates operation of OLTP (Online Transaction Processing) systems. This allows optimizing and speeding up data-modifying database transactions, such as Insert, Update and Delete. In addition, a Star schema database design is used, which allows optimization of data retrieval in OLAP (i.e., Online Analytical Processing) systems. By employing the Star schema design approach, better response time is achieved in accessing the data while simultaneously attaining high level of scalability of the system. Adding a new data collection element to the system can be accomplished by one additional table object, without needing to modify any existing objects.

Figure 6:
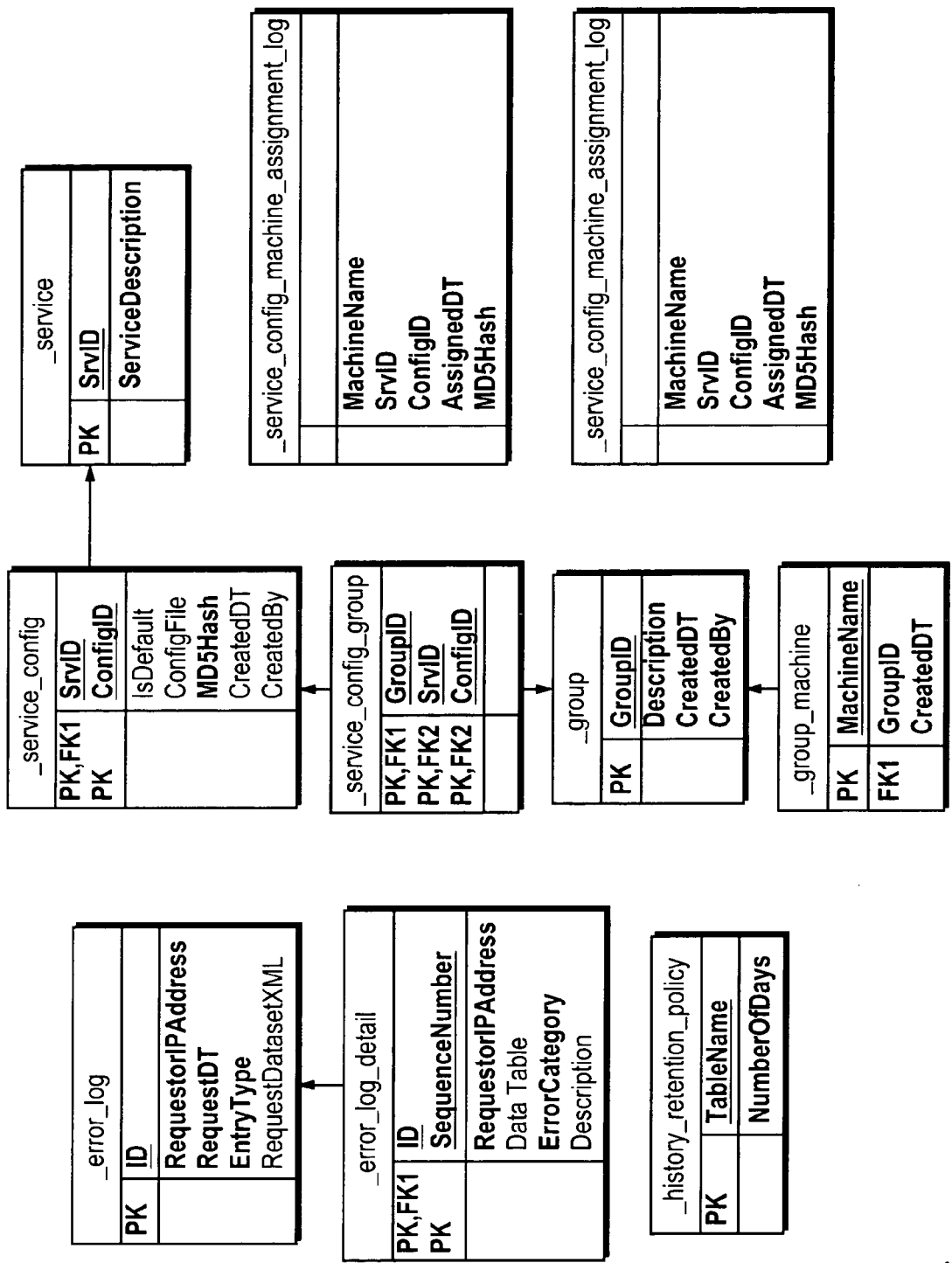
FIG. 6 provides an exemplary inventory data schema.

With reference to FIG. 5, an exemplary schema of database objects used by database design is shown. Two main models are defined in database 105—(1) system and application and (2) inventory data. With reference to FIG. 6, the inventory data schema is shown.

Figure 7:
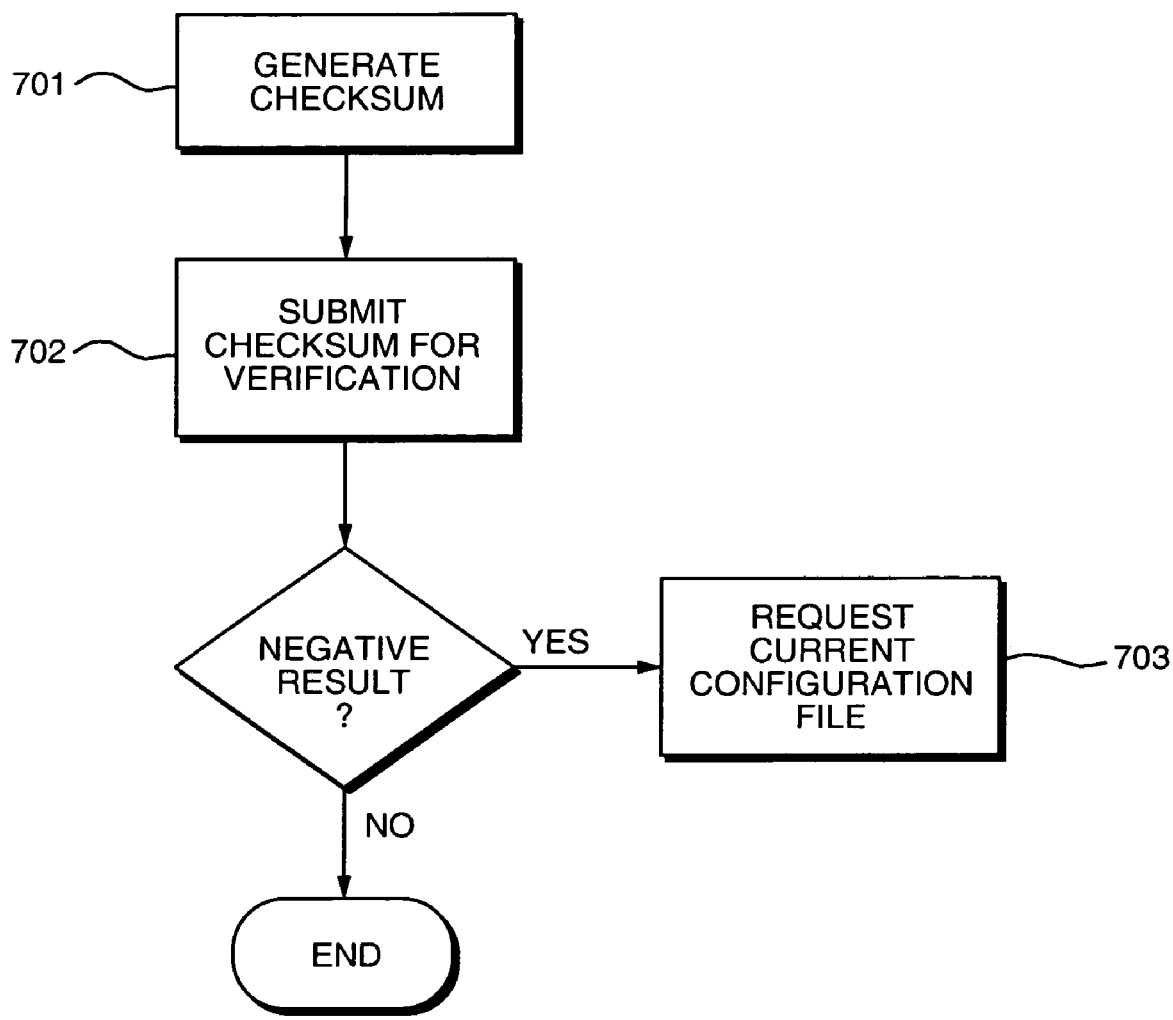
FIG. 7 is a flow chart illustrating a preferred embodiment of a method of the present invention.

With reference to FIG. 7, a preferred embodiment of a method for collecting computer asset information on a network in accordance with a configuration file is shown. The method operates in a system that includes one or more clients (that include a hardware inventory agent), servers, and databases communicating over the network. A checksum of the configuration file is generated in step 701. The checksum is submitted to the server(s) over the network for verifications in step 702, which includes comparing the checksum to current client configuration information stored in the database(s). If the verification produces a negative result, a current configuration file is requested from the server(s) in step 703. The configuration file includes processing instructions and a component extending a capability of the hardware inventory agent.

Figure 8:
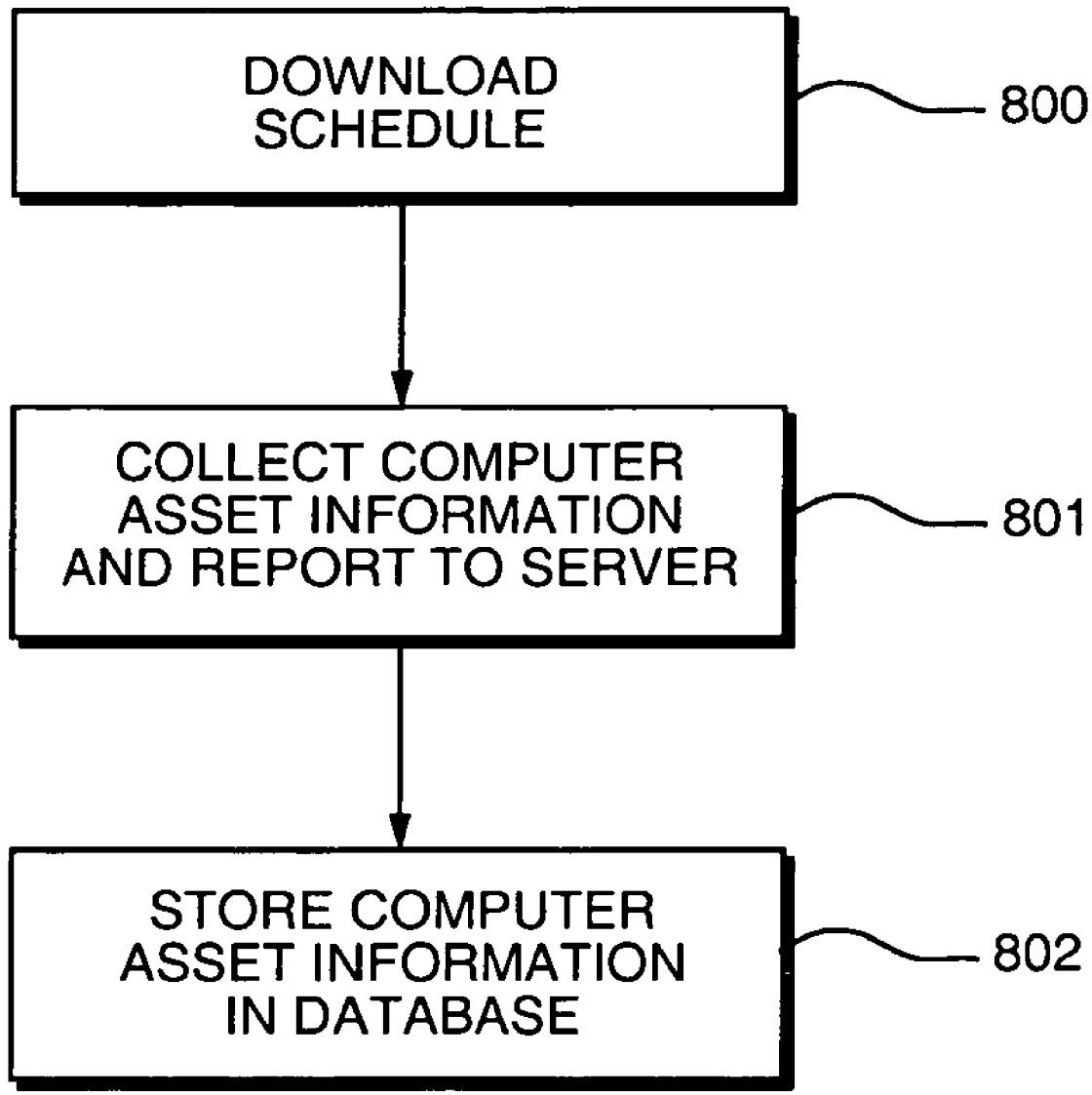
FIG. 8 is a flow chart illustrating a preferred embodiment of another method of the present invention.

With reference to FIG. 8, a preferred embodiment of a method operating in a system that includes one or more clients (including a scheduling agent), servers, and databases, communicating over a network is shown. A schedule is downloaded by the server(s) to the client(s), in step 800, and executed by the scheduling agent. In step 801, computer asset information is collected, in accordance with the schedule, and reported to the server(s). The computer asset information is stored in the database(s) in step 802.

It will be appreciated by those skilled in the art that changes could be made to the embodiments described above without departing from the broad inventive concept thereof. It is understood, therefore, that this invention is not limited to the particular embodiments disclosed, but is intended to cover modifications within the spirit and scope of the present invention as defined in the appended claims.

What is claimed is:

1. A system comprising:
    (A) one or more clients;
    (B) one or more databases; and
    (C) one or more servers, each of the one or more servers comprising:
        (i) a first server component that performs a plurality of functions comprising (a) receiving requests from at least one of the one or more clients for configuration file verification information; (b) storing in at least one of the one or more databases a log of the requests; (c) providing any updates to a configuration file; and (d) storing a log of provided updates in at least one of the one or more databases; and
        (ii) a second server component that is capable of performing a plurality of functions comprising (a) receiving one or more of software inventory information, hardware inventory information, and software metering statistics; and (b) storing one or more of the software inventory information, the hardware inventory information and the software metering statistics in at least one of the one or more databases;
    wherein one or more of the one or more clients each comprise an inventory agent that collects one or both of the hardware inventory information and the software inventory information in accordance with the configuration file, wherein code is extracted from the configuration file and injected into the inventory agent to enable collection of the inventory information, wherein the collected inventory information comprises inventory information that the inventory agent is not configured to collect at a time of implementation of the inventory agent.

2. The system of claim 1 wherein one or more of the one or more clients further comprise:
    a software metering agent that collects the software metering statistics in accordance with a configuration file.

3. The system of claim 1 wherein one or more of the one or more servers further comprise:

a third server component that is triggered by a network status change event to identify a computer asset on the network that is associated with the network status change.

4. The system of claim 1 wherein one or more of the one or more servers further comprise:

a fourth server component that identifies a computer asset on the network in response to data feeds from at least one of the one or more databases.

5. The system of claim 3 wherein the network status change event comprises one of an event in an active directory, an event in an IP management system, and an event log message collected on a DHCP server.

* * * * *